Oct. 19, 1954  J. J. NICOLAS  2,691,868
ROTARY PUMP AND MOTOR HYDRAULIC TRANSMISSION
Original Filed Oct. 23, 1946  3 Sheets-Sheet 1

Inventor:
Jean Joseph Nicolas
by: Michael S. Striker

Oct. 19, 1954   J. J. NICOLAS   2,691,868
ROTARY PUMP AND MOTOR HYDRAULIC TRANSMISSION
Original Filed Oct. 23, 1946   3 Sheets-Sheet 2
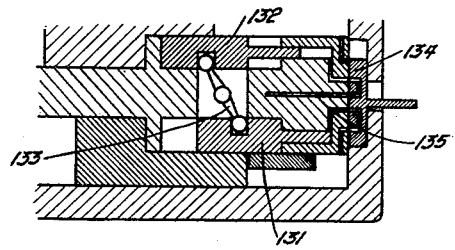
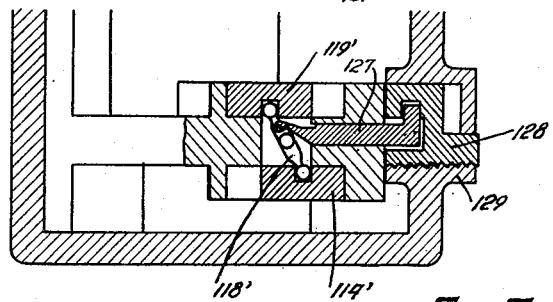
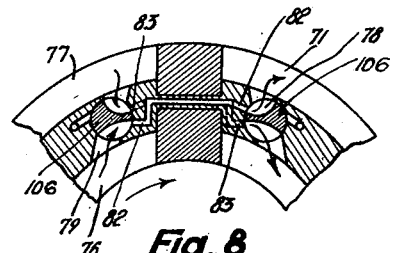
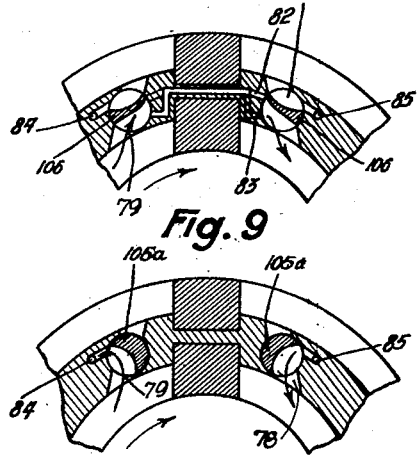
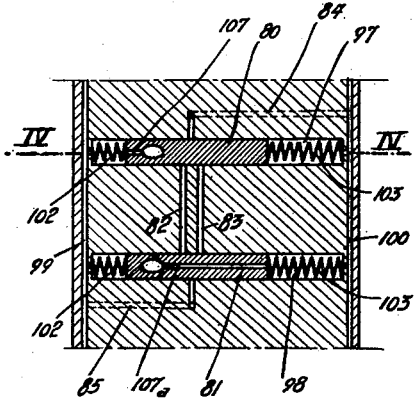

Oct. 19, 1954         J. J. NICOLAS         2,691,868
ROTARY PUMP AND MOTOR HYDRAULIC TRANSMISSION
Original Filed Oct. 23, 1946         3 Sheets-Sheet 3
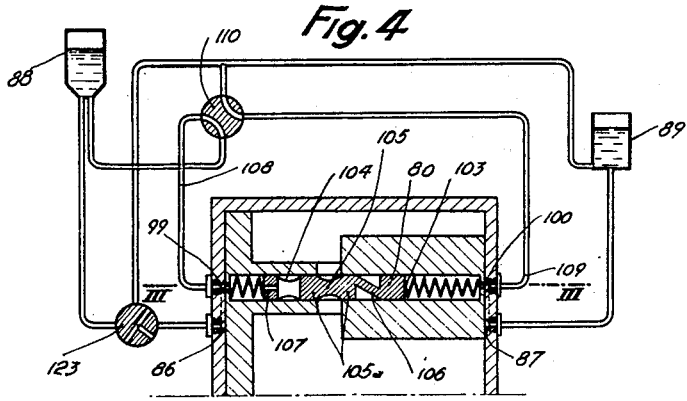
Fig. 4
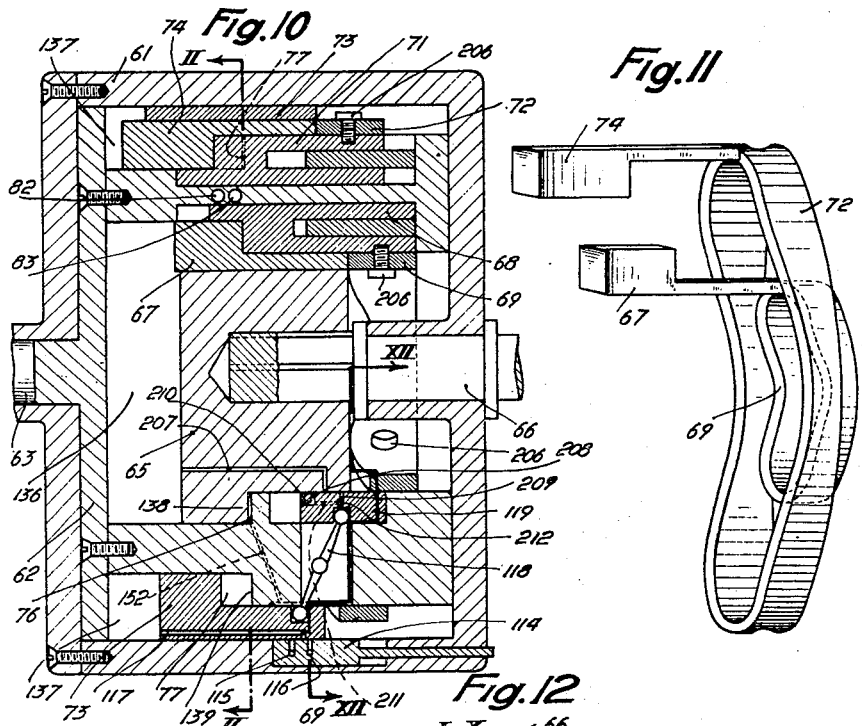
Fig. 10
Fig. 11
Fig. 12

Patented Oct. 19, 1954

2,691,868

UNITED STATES PATENT OFFICE 2,691,868

ROTARY PUMP AND MOTOR HYDRAULIC TRANSMISSION

Jean Joseph Nicolas, Paris, France

Original application October 23, 1946, Serial No. 705,102, now Patent No. 2,607,298, dated August 19, 1952. Divided and this application March 11, 1949, Serial No. 80,924

Claims priority, application France November 12, 1945

3 Claims. (Cl. 60—53)

1

The present invention relates to a hydraulic transmission comprising a rotary pump and a rotary motor.

The present application is a divisional application of application Serial No. 705,102 filed October 23, 1946, and issued into U. S. Patent No. 2,607,298.

In the above mentioned U. S. Patent No. 2,607,298 a hydraulic apparatus is disclosed which may be operated as a pump or as a motor and which achieves a perfect axial balancing of the rotor by means of the operating fluid. The hydraulic apparatus according to my previous invention also permits a perfect control of the output of the apparatus.

It is one object of the present invention to make use of the advantageous features of a hydraulic apparatus of this type in an improved highly efficient hydraulic transmission consisting of two hydraulic apparatus of this type.

It is another object of the present invention to provide means in a hydraulic transmission of this type for simultaneously and reversely adjusting the output per revolution of the pump and of the motor constituting the hydraulic transmission.

It is a further object of the present invention to provide a hydraulic transmission in which motor and pump are arranged within a single casing which also envelopes the necessary conduits connecting the pump and the motor.

It is still another object of the present invention to provide a hydraulic transmission in which the motor can be reversed, and in which the transmission ratio can be adjusted during rotation in either direction.

It is also an object of the present invention to provide a hydraulic transmission for motor cars which can be easily operated, and which is provided with operating means for by-passing the rotary pump and for connecting the motor to a hydraulic accumulator to provide hydraulic braking.

With these objects in view the present invention mainly consists in a hydraulic transmission arrangement comprising, in combination, a stationary casing, a driven shaft rotatably mounted in the casing, a motor rotor fixedly secured to the driven shaft and rotatably mounted in the casing, the motor rotor being formed with an inner cavity having a main portion open at one end and bounded by a circular transverse end face, a cylindrical face, and a transverse annular face facing the end face, the motor rotor having an outer surface portion including an annular transverse end face, a cylindrical face, a second transverse annular face facing the first annular end face and defining with the inner surface of the casing an annular cavity, a drive shaft rotatably mounted in the casing, a pump rotor mounted on the drive shaft slidable in axial direction and non-rotatable, the pump rotor having a stepped cylindrical outer surface fitting into the inner cavity of the motor rotor and closing the main portion, the motor rotor having a cylindrical head portion located in the main portion between the end face and the annular face and defining with the pump rotor in the inner cavity a closed cylindrical pump balancing chamber and an annular pump working chamber, stator means, non-rotatably and axially slidably mounted on the inner surface of the casing, and having an annular projecting portion dividing the annular cavity into an annular motor balancing chamber and an annular motor working chamber, partitioning means secured to the motor rotor and projecting into the pump working chamber and into the motor working chamber and dividing each of the working chambers, pump blade means and motor blade means mounted, respectively, on the pump rotor and on the stator means slidable in axial direction, the blade means projecting with one end thereof into the associated balancing chambers and into the associated working chambers and defining in the latter chamber together with the partitioning means suction portions and pressure portions, cam means secured to the partitioning means and engaging the other end of the blade means for pushing the same into the associated balancing chambers and out of the working chambers when the blade means pass the partitioning means during rotation of the rotor, conduit means in the motor rotor connecting the pressure portion of each working chamber with the suction portion of the other of the working chambers, first fluid valve means associated with the pump rotor and being movable between two positions and connecting in one of the positions the pump balancing chamber with the pressure portion of the pump working chamber and in the other position with the suction chamber of the pump working chamber, second fluid valve means associated with the stator means and being movable between two positions and connecting in one of the positions the motor balancing chamber with the pressure portion of the motor working chamber and in the other position with the suction portion of the motor working chamber, connecting means connecting the first and second fluid valve means so that each of the fluid valve means moves to the one position thereof when the other of the fluid valve means moves to the other position thereof, whereby the fluid pressure in the balancing chambers is adjusted causing axial movement of the pump rotor and of the stator means for adjusting the volumes of the annular working chambers, and means for adjusting the position of at least one of the fluid valve means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a developed view of cylindrical section taken on line III—III in Fig. 1;

Fig. 4 is a cross-sectional view on line IV—IV of Fig. 3;

Figs. 5 and 6 are fragmentary sectional views illustrating modifications of the means controlling the output;

Figs. 7–9 are fragmentary cross-sectional views illustrating valve positions corresponding to different operational conditions of the hydraulic transmission;

Fig. 10 is an axial sectional view taken on line X—X in Figs. 2 and 12 in a position of the transmission in which the blades are located opposite the partitions and under operational conditions of maximum speed reduction;

Fig. 11 is an isometric view of cam means provided for advancing the blades into the working chambers; and Fig. 12 is a cross-sectional view taken on line XII—XII of Figs. 1 and 10.

Figure 1:
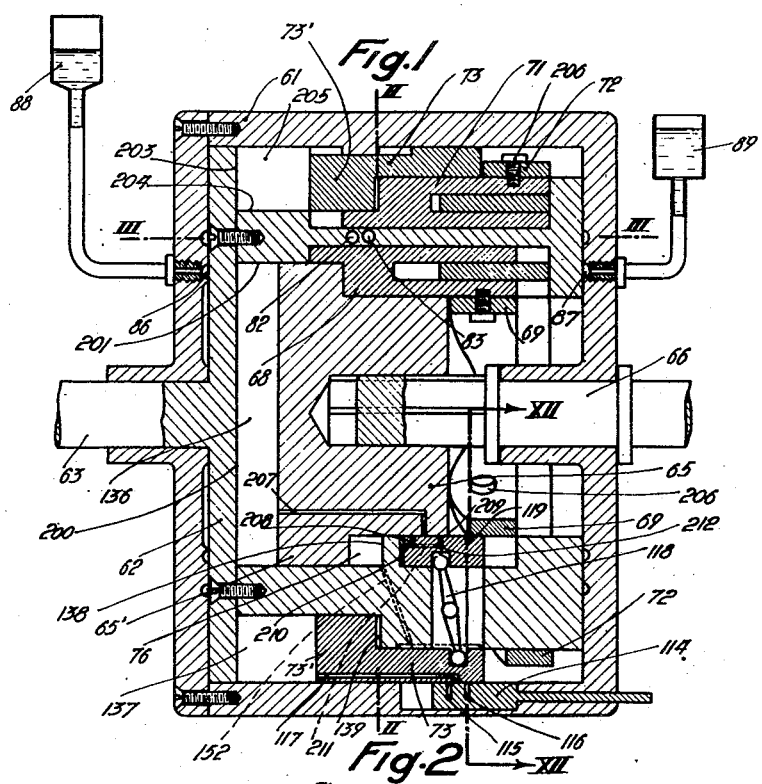
Fig. 1 is an axial sectional view of the hydraulic transmission according to the present invention in the position of direct drive taken on line I—I in Figs. 2 and 12.
Figure 2:
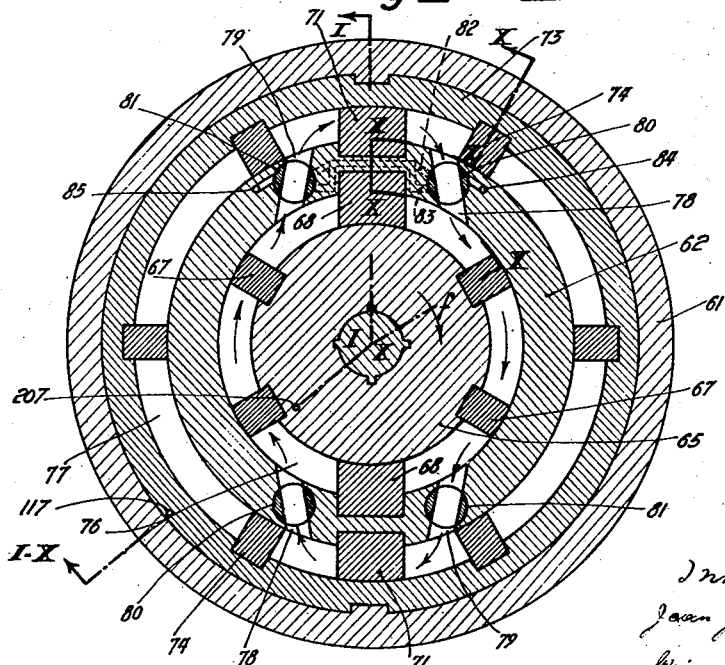
Fig. 2 is a cross-sectional view on line II—II in Figs. 1 and 10, the transmission being in an intermediate position.

Referring now to the drawings, and more particularly to Figs. 1, 2 and 10, the transmission includes an inner pump rotor 65 mounted on the drive shaft 66 non-rotatable, but slidable in axial direction. The drive shaft 66 is rotatably mounted in a stationary casing 61 which also rotatably supports the driven shaft 63 which is fixedly secured to the motor rotor 62. The motor rotor 62 is formed with an inner cavity, the main portion of which is bounded by a circular transverse end face 200, a cylindrical face 201 and a transverse annular face 138. The cylindrical head portion 65' of the pump rotor 65 divides this main portion into a pump balancing chamber 136 and an annular pump working chamber 76. Pump blade means 67 are mounted in axially extending recesses of the pump rotor, are slidable in axial direction, and slightly project with one end thereof into the pump balancing chamber 136 so as to be urged by the fluid pressure of a liquid contained therein against the cam means 69 as best seen from Figs. 10 and 11. For the sake of clarity, Fig. 11 shows only one pump blade 67 but it will be understood that a plurality of pump blades is provided, as shown in Fig. 2.

The motor rotor 63 is provided with partitioning means 68 which project into the pump working chamber 76, dividing the same. Since the pump blades project through the working chamber 76 they cannot pass the partitioning means 68 and have to be pushed out of the working chamber 76 by the cam means 69, which are accordingly shaped. During rotation, the pump blades 67 form together with the partitioning means 68 a suction portion and a pressure portion in the pump working chamber 76, as can best be seen from Fig. 2.

The outer surface of the motor rotor 62 is formed with a transverse annular face 203, a cylindrical face 204 and a second transverse annular face 139 which define an annular cavity 205 together with the inner surface of the outer casing 61. As can be best seen from Figs. 1 and 10, the stator means 73 is formed with an annular projection 73' projecting into the annular cavity 205 and dividing the same into an annular motor balancing chamber 137 and an annular motor working chamber 77. Motor blade means 74 are mounted in axially extending recesses of the stator means 73 slightly projecting into the motor balancing chamber 137 so as to be urged by the fluid pressure of a liquid contained in the balancing chamber 137 against the cam means 72. During rotation of the motor rotor 62 the blades are retracted from the motor working chamber 77 and pushed into the motor balancing chamber 137 by the cam 72 in order to permit passing of the partitioning means 71 which are secured to and rotate with the motor rotor 62. The cam means 72 and 69 are secured to the partitioning means 71 and 68, respectively, by means of screws 206 and consequently rotate with the rotor motor 62.

The cam faces of the cams 69 and 72 are of such a shape that during the relative rotation of rotor 62 with respect to rotor 65 and to the stator means 73, blades 67 and 74 bear continuously with their end faces against the associated annular faces 138 and 139 of rotor 62 so as to extend through the annular working chambers 76 and 77, thus forming expansible working areas in these chambers.

The rotor motor is formed with conduits 79 and 78 connecting the pump working chamber 76 with the motor working chamber 77.

The operation of the combined pump and motor transmission is as follows:

When the drive shaft 66 is rotated, the pump rotor 65 and the blade means 67 associated therewith rotate and push the liquid out of the pressure chamber portion of the pump working chamber 76 through conduit 79 into the receiving chamber portion of the motor working chamber 77, while the liquid is sucked from the discharge portion of the motor working chamber 77 through conduit 78 into the suction chamber portion of the pump working chamber 76, as indicated by arrows in Fig. 2. Thereby the motor rotor 62 is rotated and drives the driven shaft 63, the blades 74 being axially retracted by cam means 72 when located opposite partitions 71.

The position of the axially movable drum 73, which constitutes the stator means, is defined by control means including a fluid valve means 114 mounted on the casing 61 and formed with two spaced ports 115, 116 opening on a face which is slidably seated on a surface portion of the stator means 73. The ports 115, and 116 cooperate with a conduit 117 passing through the stator means 73.

One end of the conduit 117 communicates with the motor balancing chamber 137, while the other end is either located intermediate the conduits 115 and 116, as shown in Fig. 1, or communicates with one of these ports when the valve 114 is shifted. Fluid valve means 114 is connected by pivoted connecting means 118 with another fluid valve means 119 cooperating with the pump rotor 65. Pump rotor 65 is formed with a conduit 207 which corresponds to conduit 117 in the stator means 73, and connects the pump balancing chamber 136 with the surface portion of pump rotor 65 on which the valve means 119 is seated. Valve means 119 is formed with two ports 208 and 209 which are connected to the pressure and suction portions, respectively, of the pump working chamber 76 by conduits 210, 211 and 212.

It will be understood that pressure and suction portions are created in the working chambers 76 and 77, respectively, since the operating liquid in the pump is under pressure between a blade and the partitioning means in front of the blade, while suction is exerted in a suction chamber portion created behind the moving blade. The conduits 208, 209 and the conduits 115, 116 communicate, respectively, with the suction and pressure chamber portions of the associated working chambers 76 and 77.

When the fluid valve 114 is shifted in axial direction, one of the conduits 115 and 116 registers with conduit 117 and communicates with the motor balancing chamber 137, increasing or decreasing the pressure therein, respectively so that the stator means 73 is moved in axial direction toward or away from the annular transverse face 139 of the motor rotor whereby the volume of the motor working chamber is decreased, or increased respectively.

The operation of the fluid valve means 119 is similar, the pump balancing chamber 136 being connected through conduit 207 to the pressure chamber portion, or to the suction chamber portion of the pump working chamber 76 in accordance with the position of the valve 119 and of the ports 208 and 209 in the same.

Connecting means 118 connects the valve means 114 and 119 in such manner that one of the working chambers is increased in volume when the other of the working chambers is decreased in volume.

While the annular pressure area of the stator means 73 in the motor balancing chamber is greater than the annular pressure area 139 in the motor working chamber 77, a movement of the stator means 73 to the left can take place when the motor balancing chamber 137 is connected to the suction portion of the motor working chamber 77 since the fluid pressure as well, and not only the pressure area is decisive for the movement of the stator means 73. On the annular surface 139 a median pressure is exerted since there are suction portions and pressure portions in the motor working chamber 77. The force tending to move the stator 73 to the left is the product of such median pressure multiplied by the area of the surface 139. In the event that this force is greater than the force acting on the stator means 73 in the balancing chamber 137, the stator means will move to the left. This condition will arise when fluid is sucked out from the motor balancing chamber 137 through conduit 117 connected through one of the ports 115, 116 to the suction portion of the working chamber 77. When the motor balancing chamber is connected to the pressure portion of the motor working chamber 77, the stator means will move to the right.

The valve means 119 operates similar to valve means 114, the connecting means 118 assuring a simultaneous and coordinated operation of the two valves in such manner that the pump working chamber 76 is increased in volume when the motor working chamber 77 is decreased in volume and vice versa.

During normal operation, one end of conduit 117 will be located between the two ports of the conduit 115, 116, and one end of conduit 207 will be located between the ports 208 and 209, since a slight axial movement of the stator means 73 and of the rotor 65, respectively, will result in registering of the associated conduit 117 or 207, respectively with one of the ports whereby a return movement of the members 73 and 65 is effected. Consequently the stator means 117 will be maintained in an intermediate position unless the valves 114, 119 are operated.

In the conduits 78 and 79, hydraulically operated fluid valve means 80 and 81 are arranged which are movable in axial direction between several positions, and which are shown in Figs. 2, 7, 8 and 9. The corresponding ducts 78, 79 are arranged, respectively, on either side of the same partitioning means 71 and are connected by two channels 82, 83 provided within the rotor 62. Into each of the ducts 78, 79, two further conduits 84, 85 open which communicate through the circular grooves 86, 87 in the casing 61 with the hydraulic accumulator 88 and with the reservoir 89, respectively. The valves 80 and 81 are arranged, respectively, in the bores 97, 98, extending parallel to the axis of the rotor 62 in the same, and communicating through smaller ports with circular grooves 99, 100 in the circular head plates of the casing 61. In each bore 97, 98 two springs 102 and 103 are arranged which act in opposite directions on the associated valve. Each valve 80, 81 comprises three portions 104, 105 and 106, corresponding, respectively, to forward drive, to neutral, and to rearward drive, as will be explained in greater detail hereinafter. The portion 104 of the valve 80 associated with duct 78, which supplies pressure fluid for forward drive, communicates through longitudinal channels 107 with the groove 99. The portion 104 of the other valve 81 in the duct 79 is connected through a duct 107a with the groove 100. The grooves 99, 100 are interconnected by ducts 108 and 109 with the four-way cock 110 which on the other hand is connected with the accumulator 88 and with the reservoir 89 through connecting conduit means.

The operation of the valve means 81 and 82 is as follows:

The spring 102 and 103 are arranged to hold the valve 80, 81 in a position of equilibrium, see Figs. 4 and 8, in which the portions 105 register with the ducts 78 and 79, respectively and divide the same in the two portions which do not communicate, while the openings of the channels 82, 83 are all located in the duct portion communicating with the chamber 76 and thereby with the pump. Consequently the pump is by-passed which corresponds to the neutral position of the transmission. At the same time, the portion of the duct 79 opening into working chamber 77, communicates with the channel 84 which is connected to the reservoir 89 through the circular grooves 87 in the casing 61, while the corresponding portion of duct 78 communicates with conduit 85 and annular groove 86, and through the three-way cock 123 with the reservoir 89 or with the accumulator 88 according to the position of the operating cock 123. In the first position a free wheel operation of the transmission is obtained and the liquid forced to flow by the rotation of rotor 62 passes freely through a closed circuit including chamber 77 and the reservoir 89. In the second position, hydraulic braking is obtained and the pressure of the liquid contained in the accumulator 88 opposes the rotation of the rotor 62.

By operating suitable operating means, such as the four-way cock 110, the accumulator 88 is connected with the duct 108, and the conduit 109 with the reservoir 89 so that the pressure fluid is effective in groove 99 and the valves 80, 81 are actuated and compress the springs 103 so that the ports 104 register with the ducts 78, 79 and allow the fluid to pass freely through ducts 78, 79 as illustrated in Fig. 2. When pump rotor 65 is rotated by shaft 66 in the direction of the arrow f, the portions of the blades 67 projecting into the pump working chamber 76, and providing the effective surfaces of the blades, act on one side of the partition 68 on the operating fluid to force the same into the motor working chamber 77 through the ducts 79, while on the other side of the partitioning means 68 the projecting portion of the blades create suction to draw the operating medium from motor working chamber 77 into pump working chamber 76.

The fluid is then circulated through the ducts 78, 79 as shown by the arrows, and the rotor 62 is forced to rotate in the direction of shaft 66 as shown by arrows, which correspond to forward drive. When the slide valves 80, 81 are placed in the position illustrated in Fig. 7, admitting pressure fluid into the groove 100, the valves close by means of portions 106 the ducts 78, 79 at a point intermediate the connections of the latter with the channels 82, 83 whereby any direct communication between chamber 76 and 77 through ducts 78 and 79 is cut off, but another connection is formed by the channels 82, 83 which are arranged in such manner that the liquid delivered by the pump from pump working chamber 76 into the closed duct 79 passes through the channel 82 into the closed part of duct 78 through which the liquid is guided out of chamber 77 in the valve position illustrated in Fig. 8. The liquid then enters chamber 77 through the duct 79 which previously served for admission of liquid from the pump. The liquid from chamber 77 passes through the duct 79 and duct 83 into the part of duct 78 which communicates with the suction chamber portion of the pump into which it returns. Consequently the flow of liquid in the annular working chambers 76 and 77 is reversed and this results in a reversal of direction of rotation of the rotor 62 and consequently in rearward drive of the transmission. The slide valves 81, 82 are moved to the position illustrated in Fig. 7 by admitting pressure fluid into the groove 100 by moving the four-way cock 110 into a position in which the hydraulic accumulator 88 communicates with the duct 109 and the reservoir 89 communicates with the duct 108.

When the volume of the motor working chamber 77 is great, and the volume of the pump working chamber 76 is small, the secondary rotor 62 rotates at a low speed compared to the speed of the drive shaft 66 whereby maximum speed reduction is obtained. If the volume of pump working chamber 76 is reduced to zero by shifting the control valve 119 to cause the pump rotor 65 to move in axial direction, the pump and the motor are disconnected corresponding to a neutral position. Direct drive is obtained when the volume of the pump working chamber 76 is a maximum and the volume of the motor working chamber 77 is a minimum as illustrated in Fig. 1 in which the stator means 73 has moved to the right of the figure, while rotor 65 has moved to the left of the figure to its extreme position. In this position ducts 78 and 79 are closed by stator means 73 and direct drive is obtained. In the intermediate positions of the rotor 65 and of the stator means 73, intermediate speed reduction ratios are obtained. It will be apparent that the transmission ratio can be varied continuously between direct drive and minimum and maximum forward and rearward speeds by operating the valve means 114 and 119.

The hydraulic transmission may be operated in another manner as well. During the displacement of each slide valve 80 from its neutral position (Fig. 8) into its forward drive position (Fig. 2) or rear drive position (Fig. 7), the one or the other of the portions 105a situated on both sides of its portion 105 registers with the corresponding duct 78 or 79 (Fig. 9). During this temporary intermediate position of slide valves 80, the direct communication between the chambers 76 and 77 through ducts 78 and 79 is cut off and another communication is established between the delivery side of the pump and the channel 85 communicating with the cock 123, while the portion of duct 79 communicating with the suction side of the pump registers with duct 84 connected to the reservoir 89. If the cock 123 is then operated so as to put the channel 85 into communication with the accumulator 88, the apparatus works as a starter, the fluid under pressure within the accumulator starting rotation of the pump and flowing thereupon into the reservoir 89, as indicated by the arrows in Fig. 9.

To start the engine, it suffices therefore to bring the cock 123 into the position indicated above, then to open the cock 110 so as to introduce fluid under pressure into groove 99 or 100, according to the desired direction of rotation. If the cock 110 is then shut, the slide valves 80 will tend to return to their relieved position, but on account of the narrow cross-section of the bores 107, 107a, they will return very slowly so that the portions 105a will remain in communication with the ducts 78, 79 for sufficient time to ensure starting of the apparatus. Thereupon, the cock 110 may be operated again so as to bring the slide valves 80 into the position for forward drive (Fig. 2) or rearward drive (Fig. 7) and to maintain such position.

In the case of the application of this hydraulic transmission to an automobile, the cock 123 may be controlled by the brake pedal so that when the latter is not depressed, cock 123 is in the position in which the channel 85 communicates with the reservoir 89 whereas when the pedal is depressed, the cock 123 establishes communication of said channel 85 with the accumulator 88. The braking effect is then increased by increasing the volume of the chamber 77 by a connection between the brake pedal and the control valve means 114, 119.

In a similar manner, it is easy to provide with this arrangement an automatic change speed gear depending solely on the movement of the gas throttling means of the engine.

Of course, the present invention is by no means limited to the details of the embodiments illustrated or described only by way of example. Thus in particular in the embodiment illustrated in Fig. 5 and covering the control means for the transmission ratio, the two slide valves 114' and 119' are still coupled through a rocking member 118' but it is this latter which is directly engaged by the control device which is mechanical in the case considered and is constituted by a sliding rod 127 controlled by an arrangement including a threaded member 128 moving inside a stationary nut member 129.

In the modified embodiment illustrated in Fig. 6, the slide valves 131 and 132 which are associated for operation by the pivoted member 133, are carried by the rotor 62. A common control slide valve 134, carried by the casing 61 allows admission of the fluid under pressure through the port 135 which is in permanent connection with the delivery end of the pump into slide valve 131 while the slide valve 132 is simultaneously connected with the suction end. It should be noted that the port 135 registers with the distribution channel of the slide valve 134 only for a very short time during each revolution of the rotor which makes the operation of the slide valve 131 and 132 comparatively slow and gradual. Consequently, the variation in volume of the working chambers 76 and 77 which is produced by the longitudinal displacement of the primary rotor 65 and of the drum 73 will also be slow.

This transmission is also easily adaptable to automatic control of the transmission ratio through a regulator of any type in the case of an automatic control depending on fluid pressure. It is therefore sufficient to connect the output control valve member for (such as 114 in Fig. 1, 128 in Fig. 5, or 134 in Fig. 6) or the pivoted connecting member 118 or 118', to a pressure responsive member actuated by pressure fluid against the action of a suitably sized spring; any increase or reduction of the fluid pressure will result a variation in output and consequently a variation in the transmission ratio as desired.

For certain applications where it is desirable to obtain maximum simplicity, it is possible to omit the oil reservoir and the accumulator which serve only for braking and starting. In the absence of any accumulator and reservoir, it is preferable to circulate the fluid through a radiator in order to avoid any excessive heating of the operating fluid.

It is also possible to provide a direct positive drive as in the usual gear transmission through direct mechanical engagement between the primary and the secondary rotor.

Furthermore, by reversing the primary and the secondary transmission parts, I obtain a speed multiplying device.

It will be understood that the elements described above may also find a useful application in other types of hydraulic transmissions. The invention is not intended to be limited to the details shown, since various modifications may be made without departing from the spirit of the present invention.

What is claimed as new and desired to be secured by Letters Patent is:

1. In a hydraulic transmission arrangement, in combination, a stationary casing; a driven shaft rotatably mounted in said casing; a motor rotor fixedly secured to said driven shaft and rotatably mounted in said casing, said motor rotor being formed with an inner cavity having a main portion open at one end and bounded by a circular transverse end face, a cylindrical face, a transverse annular face facing said end face, said motor rotor having an outer surface portion including an annular transverse end face, a cylindrical face, a second transverse annular face facing said first annular end face and defining with the inner surface of said casing an annular cavity; a drive shaft rotatably mounted in said casing; a pump rotor mounted on said drive shaft slidable in axial direction and non-rotatable, said pump rotor having a stepped cylindrical outer surface fitting into said inner cavity of said motor rotor and closing said main portion, said motor rotor having a cylindrical head portion located in said main portion between said end face and said annular face and defining with the said pump rotor in said inner cavity a closed cylindrical pump balancing chamber and an annular pump working chamber; stator means non-rotatably and axially slidably mounted on the inner surface of said casing, and having an annular projecting portion dividing said annular cavity into an annular motor balancing chamber and an annular motor working chamber; partitioning means secured to said motor rotor and projecting into said pump working chamber and into said motor working chamber and dividing each of said working chambers; pump blade means and motor blade means mounted, respectively, on said pump rotor and on said stator means slidable in axial direction, said blade means projecting with one end thereof into the associated balancing chambers and into the associated working chambers and defining in the latter chambers together with said partitioning means suction portions and pressure portions; cam means secured to said partitioning means and engaging the other end of said blade means for pushing the same into the associated balancing chambers and out of said working chambers when said blade means pass said partitioning means during rotation of said rotor; conduit means in said motor rotor connecting said pressure portion of each working chamber with the suction portion of the other of said working chambers; first fluid valve means associated with said pump rotor and being movable between two positions and connecting in one of said positions said pump balancing chamber with the pressure portion of said pump working chamber and in the other position with the suction chamber of said pump working chamber; second fluid valve means associated with said stator means and being movable between two positions and connecting in one of said positions said motor balancing chamber with the pressure portion of said motor working chamber and in the other position with the suction portion of said motor working chamber; connecting means connecting said first and second fluid valve means so that each of said fluid valve means moves to said one position thereof when the other of said fluid valve means moves to said other position thereof, whereby the fluid pressure in said balancing chambers is adjusted causing axial movement of said pump rotor and of said stator means for adjusting the volumes of said annular working chambers; and means for adjusting the position of at least one of said fluid valve means.

2. A hydraulic transmission arrangement as claimed in claim 1, wherein at least said second fluid valve means has a face slidably engaging a surface portion of said stator means and formed with two spaced ports communicating with the pressure portion and with the suction portion of said motor working chamber, and wherein said stator means is formed with a conduit connecting said motor balancing chamber with said surface portion of said stator means at a point intermediate said two ports for connecting each of said ports through said conduit with said motor balancing chamber.

3. A hydraulic transmission arrangement as claimed in claim 1 and including a hydraulic accumulator; a reservoir; hydraulically operated valve means arranged in said conduit means; connecting conduit means connecting said hydraulic accumulator and said reservoir, respectively, with said hydraulically operated valve means; operating means located in said connecting conduit means for controlling the direction of flow of an operating liquid through said connecting conduit means to said hydraulically operated valve means, said motor rotor being formed with a channel system controlled by said hydraulically operated valve means so that in one position of said hydraulically operated valve means the direction of rotation of said motor rotor is reversed, and in another position of said hydraulically operated valve means said suction portion and said pressure portion of said pump working chamber are connected by a portion of said channel system for by-passing said motor working chamber.

References Cited in the file of this patent

UNITED STATES PATENTS

| Number | Name | Date |
|---|---|---|
| 602,618 | Eyster | Apr. 19, 1898 |
| 1,354,777 | Rock | Oct. 5, 1920 |
| 1,365,553 | Sheriff | Jan. 11, 1921 |
| 1,497,741 | Schneider | June 17, 1924 |
| 1,571,954 | Lambert | Feb. 9, 1926 |
| 1,742,215 | Pigott | Jan. 7, 1930 |
| 1,779,757 | Streckert | Oct. 28, 1930 |
| 1,797,439 | Napier | Mar. 24, 1931 |
| 1,797,905 | Dooley | Mar. 24, 1931 |
| 1,829,261 | Bruckner | Oct. 27, 1931 |
| 1,870,824 | Shepard | Aug. 9, 1932 |
| 1,954,793 | Averin | Apr. 17, 1934 |
| 1,990,750 | Pigott | Feb. 12, 1935 |
| 2,181,962 | Booth | Dec. 5, 1939 |
| 2,221,308 | Dischert | Nov. 12, 1940 |

FOREIGN PATENTS

| Number | Country | Date |
|---|---|---|
| 405,823 | Great Britain | Feb. 15, 1934 |